United States Patent
Park et al.

(10) Patent No.: US 8,373,922 B2
(45) Date of Patent: Feb. 12, 2013

(54) WINDOW HAVING A LIGHT TRANSMITTANCE-ADJUSTING LAYER

(75) Inventors: Soo-Ho Park, Yongin-si (KR);
Myung-Gi Shim, Yongin-si (KR);
Dong-Gun Moon, Yongin-si (KR);
Mi-Hyun Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 133 days.

(21) Appl. No.: 12/903,148

(22) Filed: Oct. 12, 2010

(65) Prior Publication Data

US 2011/0116155 A1    May 19, 2011

(30) Foreign Application Priority Data

Nov. 18, 2009   (KR) .................. 10-2009-0111539

(51) Int. Cl.
*G02F 1/01* (2006.01)
(52) U.S. Cl. ......... 359/288; 359/280; 359/281; 359/282
(58) Field of Classification Search ............... 359/288
See application file for complete search history.

(56) References Cited

U.S. PATENT DOCUMENTS

| | | | |
|---|---|---|---|
| 6,872,453 B2 | 3/2005 | Arnaud et al. | |
| 7,311,976 B2 | 12/2007 | Arnaud et al. | |
| 2008/0092456 A1* | 4/2008 | Millett et al. | 52/1 |

FOREIGN PATENT DOCUMENTS

| | | |
|---|---|---|
| JP | 07-331430 | 12/1995 |
| JP | 08-232550 | 9/1996 |
| JP | 8-337437 | 12/1996 |
| JP | 10-152347 | 6/1998 |
| JP | 2000-119045 | 4/2000 |
| KR | 10-2009-0072863 | 7/2009 |

OTHER PUBLICATIONS

Patent Abstracts of Japan and English language machine translation of JP 08-232550 to Sakamoto, 25 pps., Published on Sep. 10, 1996.
Patent Abstracts of Japan and English language machine translation of JP 2000-119045 to Terneu et al., 9 pps., Published on Apr. 25, 2000.
KIPO Office action dated Jul. 27, 2011 in the priority Korean application No. 10-2009-0111539, pp. 1-4.
KIPO Notice of Allowance dated Mar. 27, 2012, for Korean priority Patent application 10-2009-0111539, (5 pages).
Patent Abstracts of Japan, and English machine translation of Japanese Publication 10-152347 listed above (20 pages), published on Jun. 9, 1998.

* cited by examiner

*Primary Examiner* — James Jones
(74) *Attorney, Agent, or Firm* — Christie, Parker & Hale, LLP

(57) ABSTRACT

A window includes a plurality of transparent substrates spaced apart from each other in a thickness direction; a light transmittance-adjusting layer on a surface of at least one transparent substrate of the plurality of transparent substrates and having a thermochromic or thermotropic characteristic; and an air circulator configured to circulate a heat transfer medium in a space between the plurality of transparent substrates for changing a light transmittance of the light transmittance-adjusting layer.

15 Claims, 3 Drawing Sheets

WINDOW HAVING A LIGHT TRANSMITTANCE-ADJUSTING LAYER

CROSS-REFERENCE TO RELATED APPLICATION

This application claims the benefit of Korean Patent Application No. 10-2009-0111539, filed on Nov. 18, 2009 in the Korean Intellectual Property Office, the disclosure of which is incorporated herein in its entirety by reference.

BACKGROUND

1. Field

Aspects of embodiments of the present invention relate to a window having a thermochromic or thermotropic layer.

2. Description of the Related Art

A window including a thermochromic or thermotropic layer tends to change light transmittance according to temperature or heat. Because air-conditioning and heating expenses may be reduced by adjusting light transmittance, a window including a thermochromic or thermotropic layer is environmentally-friendly.

SUMMARY

According to an aspect of embodiments of the present invention, a window includes a thermochromic or thermotropic layer and is configured such that a user may actively adjust light transmittance of the window.

Additional aspects of embodiments of the present invention will be set forth in part in the description which follows and, in part, will be apparent to those skilled in the art from the following description, or may be learned by practice of the presented embodiments.

According to one or more embodiments of the present invention, a window includes: a plurality of transparent substrates spaced apart from each other in a thickness direction; a light transmittance-adjusting layer on a surface of at least one transparent substrate of the plurality of transparent substrates and having a thermochromic or thermotropic characteristic; and an air circulator configured to circulate a heat transfer medium in a space between the plurality of transparent substrates for changing a light transmittance of the light transmittance-adjusting layer, wherein the space between the plurality of transparent substrates is sealed from an exterior of the window.

The light transmittance-adjusting layer may include at least one of a thermochromic material or a thermotropic material. The light transmittance-adjusting layer may include vanadium oxide. A stoichiometric ratio of vanadium to oxygen may be 1:2 or 2:5.

The air circulator may be configured to circulate the heat transfer medium to a space between the surface of the at least one transparent substrate and another transparent substrate of the plurality of transparent substrates. The air circulator may be configured to adjust a temperature of the heat transfer medium to control the light transmittance of the light transmittance-adjusting layer according to a target light transmittance, the target light transmittance corresponding to a reference temperature at which the light transmittance of the light transmittance-adjusting layer is substantially changed.

The air circulator may include an outlet for discharging the heat transfer medium to the space between the plurality of transparent substrates; an inlet for drawing in the heat transfer medium; an air pipe for transferring to the outlet the heat transfer medium drawn in from the inlet; and a temperature adjustor for adjusting a temperature of the heat transfer medium.

The air circulator may be configured to control a target temperature of the heat transfer medium, heat or cool the heat transfer medium according to the target temperature and circulate the heat transfer medium to the space between the plurality of transparent substrates for adjusting the light transmittance of the light transmittance-adjusting layer. The air circulator may be configured to control the target temperature of the heat transfer medium in response to a control signal input from at least one of an air-conditioning system, a heating system, a lighting-adjusting system, and a user.

The transparent substrates may be glass substrates. The window may further include a frame for supporting the plurality of transparent substrates in a multi-layered structure. The air circulator may be further configured to adjust a temperature of the heat transfer medium. The heat transfer medium may be dry air. The surface of the at least one transparent substrate may be facing a surface of another transparent substrate of the plurality of transparent substrates, and the space between the plurality of transparent substrates may be between the surface of the at least one transparent substrate and the surface of the another transparent substrate. The light transmittance-adjusting layer comprises a dielectric layer comprising at least one of tantalum oxide ($Ta_2O_5$), zinc oxide (ZnO), tin oxide ($SnO_2$), niobium oxide ($Nb_2O_5$), titanium oxide (TiO), and titanium dioxide ($TiO_2$).

BRIEF DESCRIPTION OF THE DRAWINGS

The above and other features and aspects of embodiments of the present invention will become more apparent to and readily appreciated by those skilled in the art from the following description of some exemplary embodiments of the present invention, taken in conjunction with the accompanying drawings of which.

DETAILED DESCRIPTION

Figure 1:
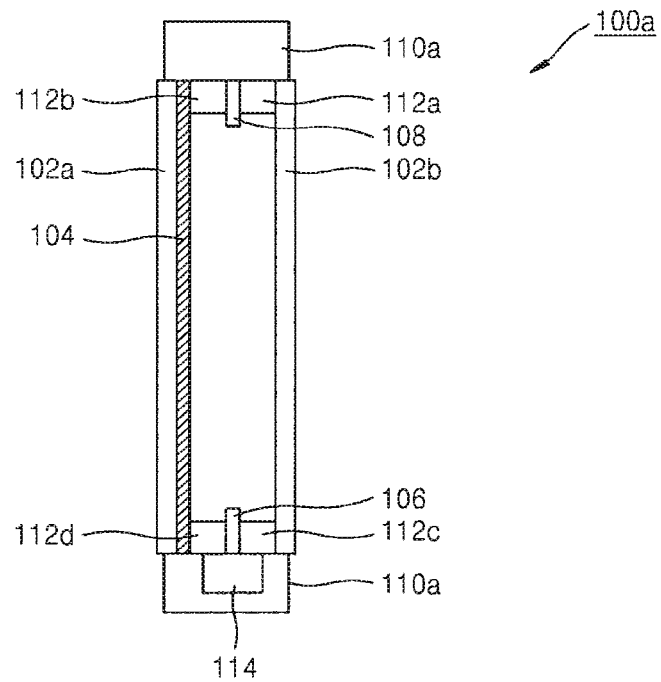
FIG. 1 is a lateral cross-sectional schematic view of a window according to an embodiment of the present invention.

Some exemplary embodiments will now be described more fully hereinafter with reference to the accompanying drawings, wherein like reference numerals refer to the like elements throughout. Embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art.

Light transmittance and reflectance of a thermochromic material in an infrared light region significantly change based on a phase transition temperature, and light transmittance or color of a thermotropic material in a visible light region significantly changes based on a phase transition temperature. Examples of such a thermochromic material include vanadium oxide. Thermochromic and thermotropic materials are environmentally-friendly because they operate according to an ambient temperature, but typically cannot be controlled by a user.

In a window according to embodiments of the present invention, light transmittance of the window having a light transmittance-adjusting layer formed of the thermochromic or thermotropic material may be adjusted as desired by a user or a system. More specifically, according to embodiments of a window of the present invention, dry air having adjusted temperature may be circulated in a sealed space of the window so as to change a phase of the thermochromic or thermotropic material, thereby quickly adjusting the light transmittance.

FIG. 1 is a lateral cross-sectional schematic view of a window 100a according to an embodiment of the present invention.

The window 100a includes a pair of glass substrates, or panels, 102a and 102b that are spaced apart from each other in a thickness direction, and a frame 110a supporting the glass substrates 102a and 102b. A light transmittance-adjusting layer 104 may be formed on a surface of at least one of the glass substrates 102a and 102b. For example, in one embodiment, the light transmittance-adjusting layer 104 is formed (e.g., coated or glazed with a thermochromic or thermotropic material) on a surface of the glass substrate 102a facing the glass substrate 102b. In one embodiment, spacers 112a, 112b, 112c, and 112d are disposed between the glass substrates 102a and 102b so as to maintain a distance between the glass substrates 102a and 102b and form a space (e.g., a space sealed from external air) between the glass substrates 102a and 102b. The window 100a includes an air circulator 114 for circulating dry air into the space between the glass substrates 102a and 102b. In order to adjust the light transmittance of the light transmittance-adjusting layer 104, the air circulator 114 is configured to adjust the temperature of the dry air and circulate the dry air into the space between the glass substrates 102a and 102b. The dry air, in one embodiment, is discharged through an outlet opening 106 and drawn in through an inlet opening 108.

The glass substrates 102a and 102b, in one embodiment, are glass panels used for window panes, but are not limited thereto, despite being described as "glass substrates" herein, so long as they are transparent or substantially transparent (e.g., a flat and wide panel of a transparent material other than glass). For example, a material, a thickness, a dimension, and a shape of the glass substrates 102a and 102b may be suitably determined according to a purpose.

The light transmittance-adjusting layer 104, in one embodiment, is formed of a thermochromic or thermotropic material and configured such that a phase transition (e.g., a metal-insulator transition (MIT) phenomenon) may occur at a certain temperature. For example, where the light transmittance-adjusting layer 104 is formed of a thermochromic material, the light transmittance-adjusting layer 104 blocks or reflects infrared light when an ambient temperature is higher than a phase transition temperature of the thermochromic material. On the other hand, the light transmittance-adjusting layer 104 allows infrared light to pass through when the ambient temperature is lower than the phase transition temperature of the thermochromic material.

The thermochromic material of the light transmittance-adjusting layer 104, in one embodiment, is vanadium oxide. Examples of the vanadium oxide include vanadium dioxide VxOy, wherein x:y=1:2 and a stoichiometric ratio of vanadium to oxygen is 1:2, vanadium oxide VOx, wherein x<2, and vanadium oxide VxOy, wherein x:y=2:5. The examples of the vanadium oxide include VOx, wherein x<2, because when the vanadium oxide has a homogeneous structure, the vanadium dioxide VxOy, wherein x:y=1:2, may exist, but when the vanadium oxide has a heterogeneous structure, relatively less vanadium may be oxidized, and thus a vanadium atom in a metal atom may be contained as it is. In particular, the vanadium dioxide, $VO_2$, is known to have a phase transition temperature of about 68° C. More specifically, the $VO_2$ is in a metallic state at a temperature higher than 68° C. and blocks or reflects infrared light. Also, the $VO_2$ is in a semiconducting state at a temperature lower than 68° C. and passes infrared light through.

In other embodiments, a material for forming the light transmittance-adjusting layer 104 is not limited to vanadium oxide, and may include any material having infrared light transmission that significantly changes based on a phase transition temperature. Further, the light transmittance-adjusting layer 104 may include a plurality of vanadium oxide layers, or multiple layers of vanadium oxide layers and dielectric layers. A dielectric layer, in one embodiment, includes at least one of tantalum oxide ($Ta_2O_5$), zinc oxide (ZnO), tin oxide ($SnO_2$), niobium oxide ($Nb_2O_5$), titanium oxide (TiO), and titanium dioxide ($TiO_2$).

Figure 2:
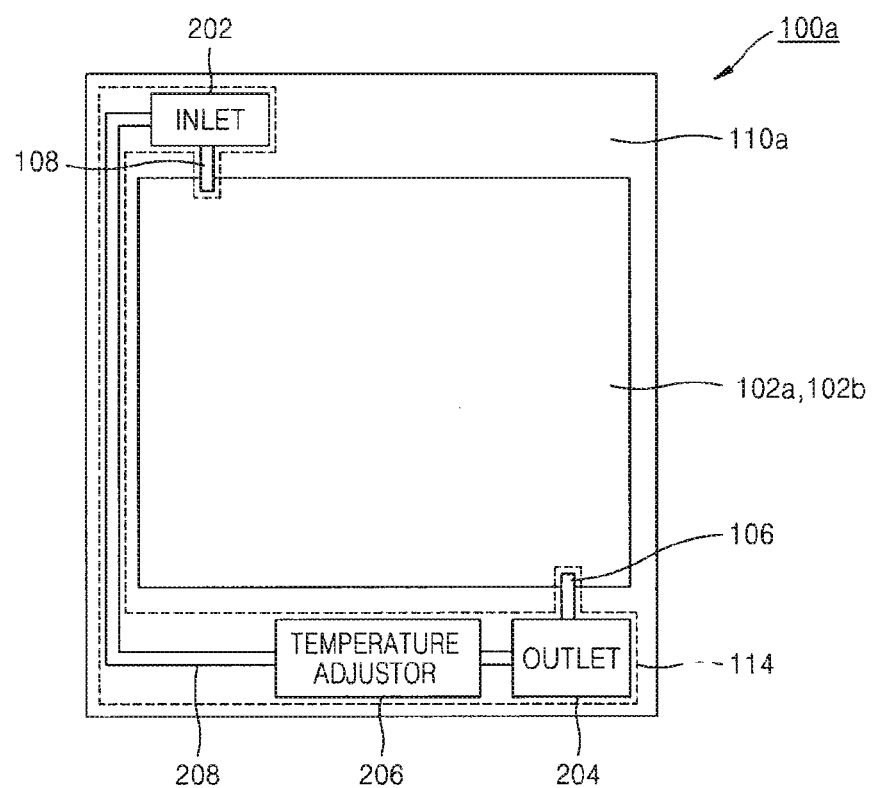
FIG. 2 is a front cross-sectional schematic view of the window of FIG. 1.

FIG. 2 is a front cross-sectional schematic view of the window 100a of FIG. 1.

The air circulator 114, according to one embodiment, includes an inlet 202, an outlet 204, a temperature adjustor 206, and an air pipe 208. The temperature adjustor 206 adjusts the temperature of dry air to be circulated between the glass substrates 102a and 102b. Although, embodiments of the present invention are described herein as circulating dry air between the glass substrates 102a and 102b, in other embodiments, any other suitable heat transfer medium other than dry air may be circulated between the glass substrates 102a and 102b. In one embodiment, the temperature adjustor 206 includes a thermoelectric element. The outlet 204 is configured to discharge the dry air having a temperature adjusted by the temperature adjustor 206 to the space between the glass substrates 102a and 102b through the outlet opening 106. The inlet 202 is configured to draw in the dry air between the glass substrates 102a and 102b through the inlet opening 108. As shown in FIG. 2, the inlet 202 may be spaced apart from the outlet 204 in a diagonal direction. The air pipe 208 is configured to transfer the dry air drawn in from the inlet 202 to the temperature adjustor 206. In one embodiment, a force for transferring the dry air in the air pipe 208 may be provided by the inlet 202 and/or the temperature adjustor 206. Alternatively, a force for transferring the dry air in the air pipe 208 may be provided, at least in part, by the outlet 204. The air circulator 114 circulates the dry air in the space (e.g., a sealed space) between the glass substrates 102a and 102b.

Figure 3:
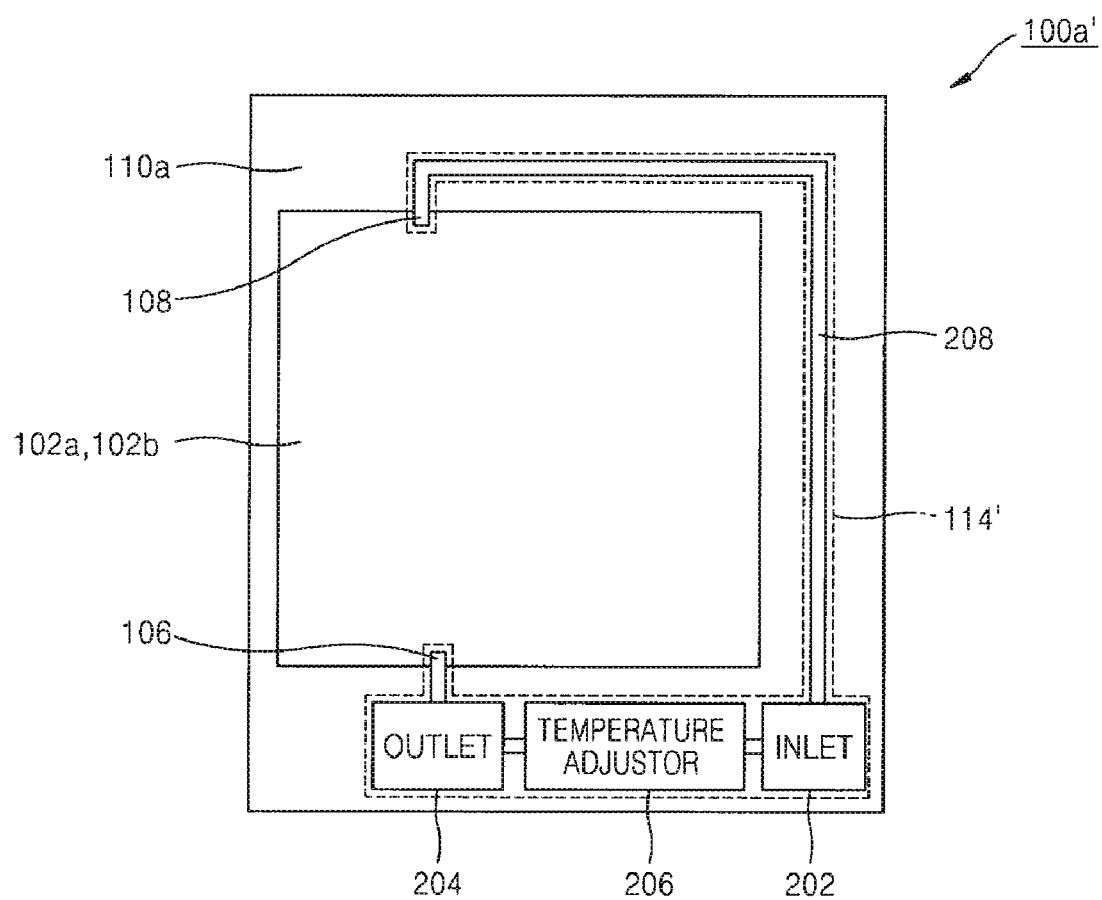
FIG. 3 is a front cross-sectional schematic view of a window having an air circulator according to another embodiment of the present invention.

FIG. 3 is a front cross-sectional schematic view illustrating a window 100a' having an air circulator 114' according to another embodiment of the present invention. As shown in FIG. 3, in the air circulator 114', the inlet 202, the outlet 204, and the temperature adjustor 206 are disposed adjacent to each other. That is, in the air circulator 114', the air pipe 208 is located upstream of the inlet 202, rather than between the inlet 202 and the outlet 204 and the inlet 202 being spaced apart from the outlet 204 in a diagonal direction as described above with respect to an embodiment of the air circulator 114.

As shown in FIGS. 2 and 3, the air circulator 114, 114' is disposed inside the frame 110a in one embodiment; however the location of the air circulator 114, 114' is not limited thereto and, in other embodiments, the air circulator 114, 114' may be disposed outside the frame 110a.

Figure 4:
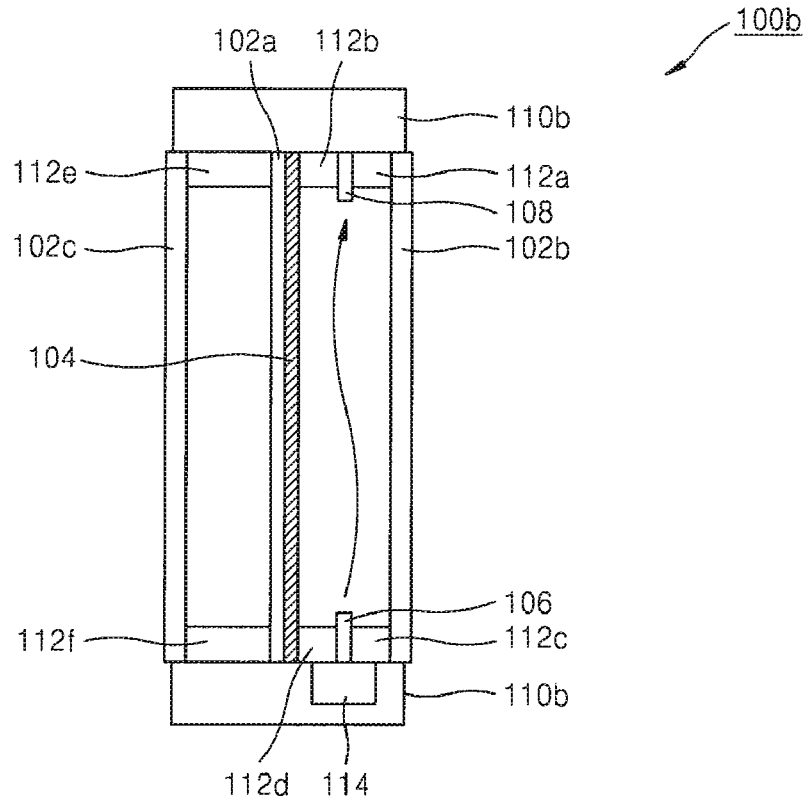
FIG. 4 is a lateral cross-sectional schematic view of a window according to another embodiment of the present invention.

FIG. 4 is a lateral cross-sectional schematic view of a window 100b according to another embodiment of the present invention.

The window 100b, according to one embodiment, has a triple-paneled structure. Of course, the scope of embodiments of the present invention is not limited by the number of glass substrates included in a window. That is, in other embodiments of a window according to the present invention, a window may include four or more glass substrates. With reference to FIG. 4, in one embodiment, glass substrates 102a, 102b, and 102c are spaced apart from each other in a thickness direction and supported by a frame 110b, wherein spacers 112a, 112b, 112c, and 112d are disposed between the glass substrates 102a and 102b, and spacers 112e and 112f are disposed between the glass substrates 102a and 102c. The light transmittance-adjusting layer 104, in one embodiment, is formed (e.g., coated or glazed with a thermochromic or thermotropic material) on a surface of at least one of the glass substrates 102a, 102b, and 102c. For example, in one embodiment, as shown in FIG. 4, the light transmittance-adjusting layer 104 is formed on a surface of the glass substrate 102a that is facing the glass substrate 102b. In one embodiment, the air circulator 114 circulates dry air having an adjusted temperature only into a space defined by, or contacting, the light transmittance-adjusting layer 104 (e.g., a sealed space between the glass substrates 102a and 102b) among spaces formed between the glass substrates 102a, 102b, and 102c. Further, in one embodiment, the window 100b may include the air circulator 114' described above and shown in FIG. 3, rather than the air circulator 114.

In another embodiment, the light transmittance-adjusting layer 104 may be disposed on a surface of at least two of the glass substrates 102a, 102b, and 102c. Further, in one embodiment, the air circulator 114 may individually adjust the temperature of dry air in spaces between the glass substrates 102a, 102b, and 102c contacting the light transmittance-adjusting layers 104, so that the light transmittance of each of the light transmittance-adjusting layers 104 is individually controlled.

Figure 5:
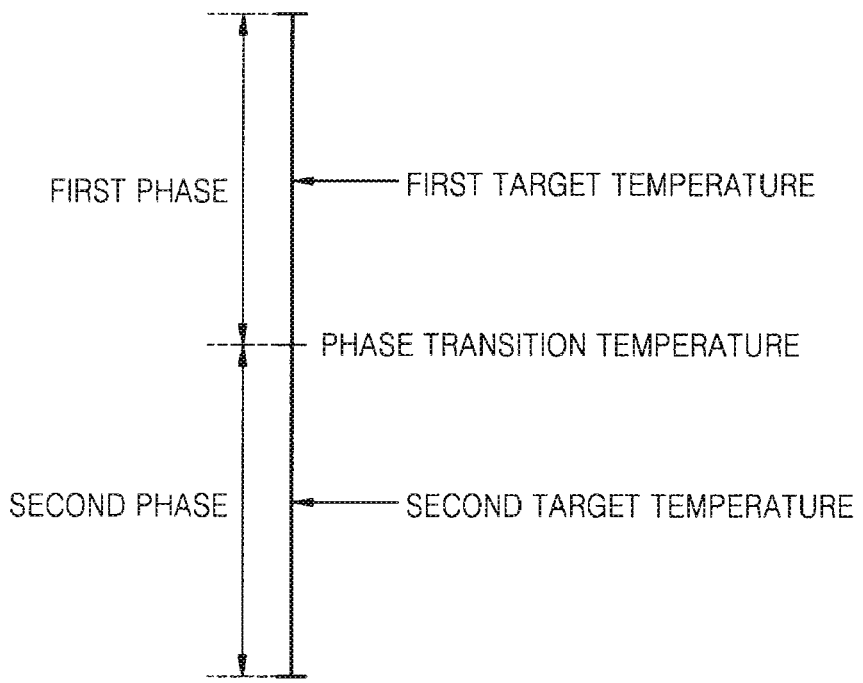
FIG. 5 is a diagram for describing a method of adjusting temperature of dry air, wherein the method is performed by an air circulator of a window according to an embodiment of the present invention.

FIG. 5 is a diagram for describing a method of adjusting temperature of dry air, wherein the method is performed by the air circulator 114, 114', according to an embodiment of the present invention.

A crystallization phase of a thermochromic or thermotropic material changes based on a phase transition temperature. In other words, as shown in FIG. 5, the thermochromic or thermotropic material may have a first phase at a temperature above the phase transition temperature, and a second phase at a temperature below the phase transition temperature. According to embodiments of the present invention, the air circulator 114, 114' adjusts the temperature of dry air so that the thermochromic or thermotropic material has the first phase or the second phase. For example, in one embodiment, when the first phase has low light transmittance, the second phase has high light transmittance, and a control signal for changing a phase of the thermochromic or thermotropic material of the light transmittance-adjusting layer 104 from the second phase to the first phase is received, the air circulator 114, 114' adjusts the temperature of the dry air to a first target temperature. On the other hand, when a control signal for changing the phase of the thermochromic or thermotropic material from the first phase to the second phase is received, the air circulator 114, 114' adjusts the temperature of the dry air to a second target temperature.

A control signal input to the air circulator 114, 114' may be input by a user in one embodiment. Accordingly, the user may actively adjust the light transmittance of the window 100a, 100a', or 100b when desired. In another embodiment, the control signal may be input by an air-conditioning and/or heating system, a temperature adjusting system, or the like. By adjusting an indoor temperature by adjusting an amount of light incident through the window 100a, 100a', or 100b, an air-conditioning and/or heating system or a temperature adjusting system that is environmentally-friendly and has low air-conditioning and/or heating expenses may be provided.

As described above, according to an aspect of embodiments of the present invention, light transmittance of a window including a thermochromic or thermotropic layer may be quickly and actively adjusted whenever desired. According to another aspect of embodiments of the present invention, by circulating dry air having an adjusted temperature in a space of the window, the thermochromic or thermotropic layer may be heated up and/or cooled down.

Some exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A window comprising:
   a plurality of transparent substrates spaced apart from each other in a thickness direction;
   a light transmittance-adjusting layer on a surface of at least one transparent substrate of the plurality of transparent substrates and having a thermochromic or thermotropic characteristic; and
   an air circulator configured to circulate a heat transfer medium in a space between the plurality of transparent substrates for changing a light transmittance of the light transmittance-adjusting layer, wherein the space between the plurality of transparent substrates is sealed from an exterior of the window,
   wherein the air circulator comprises a temperature adjustor configured to adjust a temperature of the heat transfer medium circulated into the space between the plurality of transparent substrates.

2. The window of claim 1, wherein the light transmittance-adjusting layer comprises at least one of a thermochromic material or a thermotropic material.

3. The window of claim 1, wherein the light transmittance-adjusting layer comprises vanadium oxide.

4. The window of claim 3, wherein a stoichiometric ratio of vanadium to oxygen is 1:2 or 2:5.

5. The window of claim 1, wherein the air circulator is configured to circulate the heat transfer medium to a space between the surface of the at least one transparent substrate and another transparent substrate of the plurality of transparent substrates.

6. The window of claim 1, wherein the air circulator is configured to adjust the temperature of the heat transfer medium to control the light transmittance of the light transmittance-adjusting layer according to a target light transmittance, the target light transmittance corresponding to a reference temperature at which the light transmittance of the light transmittance-adjusting layer is substantially changed.

7. The window of claim 1, wherein the air circulator further comprises:
   an outlet for discharging the heat transfer medium to the space between the plurality of transparent substrates;
   an inlet for drawing in the heat transfer medium; and
   an air pipe for transferring to the outlet the heat transfer medium drawn in from the inlet.

8. The window of claim 1, wherein the air circulator is configured to control a target temperature of the heat transfer medium, heat or cool the heat transfer medium according to the target temperature and circulate the heat transfer medium to the space between the plurality of transparent substrates for adjusting the light transmittance of the light transmittance-adjusting layer.

9. The window of claim 8, wherein the air circulator is configured to control the target temperature of the heat transfer medium in response to a control signal input from at least one of an air-conditioning system, a heating system, a lighting-adjusting system, and a user.

10. The window of claim 1, wherein the transparent substrates are glass substrates.

11. The window of claim 1, further comprising a frame supporting the plurality of transparent substrates in a multi-layered structure.

12. The window of claim 1, wherein the heat transfer medium is dry air.

13. The window of claim 1, wherein the surface of the at least one transparent substrate is facing a surface of another transparent substrate of the plurality of transparent substrates, and the space between the plurality of transparent substrates is between the surface of the at least one transparent substrate and the surface of the another transparent substrate.

14. The window of claim 1, wherein the light transmittance-adjusting layer comprises a dielectric layer comprising at least one of tantalum oxide ($Ta_2O_5$), zinc oxide (ZnO), tin oxide ($SnO_2$), niobium oxide ($Nb_2O_5$), titanium oxide (TiO), and titanium dioxide ($TiO_2$).

15. The window of claim 1, wherein the temperature adjustor comprises a thermoelectric element.

* * * * *